US012738278B2

(12) United States Patent
Shibasaki

(10) Patent No.: US 12,738,278 B2
(45) Date of Patent: Sep. 15, 2026

(54) SPEECH RECOGNITION DEVICE

(71) Applicant: FANUC CORPORATION, Yamanashi (JP)

(72) Inventor: Yasuhiro Shibasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 216 days.

(21) Appl. No.: 18/567,772

(22) PCT Filed: Jun. 22, 2021

(86) PCT No.: PCT/JP2021/023627
§ 371 (c)(1),
(2) Date: Dec. 7, 2023

(87) PCT Pub. No.: WO2022/269760
PCT Pub. Date: Dec. 29, 2022

(65) Prior Publication Data

US 2024/0282310 A1 Aug. 22, 2024

(51) Int. Cl.
*G10L 15/32* (2013.01)
*G10L 17/00* (2013.01)

(52) U.S. Cl.
CPC .............. *G10L 15/32* (2013.01); *G10L 17/00* (2013.01)

(58) Field of Classification Search
CPC ................................ G10L 15/32; G10L 17/00
See application file for complete search history.

(56) References Cited

U.S. PATENT DOCUMENTS 8,738,376 B1 * 5/2014 Goel ........................ G10L 19/00 704/226
9,275,635 B1 3/2016 Beaufays et al.
11,545,134 B1 * 1/2023 Federico ............... G10L 13/033
2002/0184016 A1 * 12/2002 Hartley ................... G10L 15/08 704/235
2004/0230420 A1 * 11/2004 Kadambe ................ G10L 15/07 704/E15.011
2005/0065793 A1 * 3/2005 Choi ....................... G10L 15/07 704/240
2008/0091435 A1 4/2008 Strope et al.
2008/0091436 A1 4/2008 Breebaart et al.
2008/0177541 A1 7/2008 Satomura
(Continued)

FOREIGN PATENT DOCUMENTS

CN 109065020 A 12/2018
JP S60-208800 A 10/1985
(Continued)

*Primary Examiner* — Huyen X Vo
(74) *Attorney, Agent, or Firm* — HAUPTMAN HAM, LLP

(57) ABSTRACT

This speech recognition device is provided with: an acceptance unit that accepts input of speech information; a parameter storage unit that stores a plurality of parameters for setting a speech recognition model; a temporary setting parameter selection unit that selects, on the basis of narrowing information, a temporary setting parameter to be temporarily set, from the plurality of parameters; a recognition unit that recognizes speech information on the basis of the selected temporary setting parameter; and a parameter selection unit that selects, on the basis of information indicating a recognition result of the recognized speech information, one of the temporary setting parameters.

10 Claims, 9 Drawing Sheets

(56) References Cited

U.S. PATENT DOCUMENTS

| | | | | |
|---|---|---|---|---|
| 2011/0301953 | A1* | 12/2011 | Lee | G10L 15/07<br>704/250 |
| 2020/0160838 | A1 | 5/2020 | Lee | |
| 2020/0310381 | A1 | 10/2020 | Tarui et al. | |
| 2021/0193161 | A1* | 6/2021 | Delcroix | G10L 15/16 |

FOREIGN PATENT DOCUMENTS

| | | | |
|---|---|---|---|
| JP | 2003-330485 | A | 11/2003 |
| JP | 2008-064885 | A | 3/2008 |
| JP | 2009-020352 | A | 1/2009 |
| JP | 2020-086437 | A | 6/2020 |
| JP | 2020-160586 | A | 10/2020 |
| KR | 10-2014-0077773 | A | 6/2014 |

* cited by examiner

START

SC1

ACCEPT SPEECH INFORMATION

SC2

RECOGNIZE SPEECH INFORMATION

END

SPEECH RECOGNITION DEVICE

RELATED APPLICATIONS

The present application is a National Phase of International Application No. PCT/JP2021/023627 filed Jun. 22, 2021.

TECHNICAL FIELD

The present disclosure relates to a speech recognition device.

BACKGROUND ART

There have been attempts to utilize speech recognition technology in the field of industrial machinery in recent years (e.g. Patent Literature 1). In order to increase the accuracy of speech recognition, it is necessary to preselect an appropriate speech recognition model.

PRIOR ART DOCUMENT

Patent Literature

[Patent Literature 1] Japanese Patent Laid-Open Publication No. 2020-160586

SUMMARY OF THE INVENTION

Problems to be Solved by the Invention

However, a task of preselecting the appropriate speech recognition model is a burden on a user.

It is an object of the present disclosure to provide a speech recognition device that can simplify the task of selecting the speech recognition model.

Means for Solving Problem

A speech recognition device includes an acceptance unit that accepts input of speech information, a parameter storage unit that stores a plurality of parameters for setting a speech recognition model, a temporary setting parameter selection unit that selects a temporary setting parameter to be temporarily set from the plurality of parameters based on narrowed information, a recognition unit that recognizes speech information based on the selected temporary setting parameter, and a parameter selection unit that selects any of the temporary setting parameters based on information indicating a recognition result of the recognized speech information.

Effect of the Invention

One aspect of the present disclosure can simplify the task of selecting the speech recognition model.

MODE(S) FOR CARRYING THE INVENTION

An embodiment according to the present disclosure will now be described with reference to the drawings. Note that not all combinations of features described in the following embodiments are necessarily required to solve the problems. In addition to that, more detailed description than necessary may be omitted. Furthermore, the embodiments described below and the drawings are provided for those skilled in the art to fully understand the disclosure, and are not intended to limit the claims.

The speech recognition device is for recognizing speech sounds produced by a speaker. The speech sounds recognized by the speech recognition device is converted into a command for operating an industrial machine, for instance. The industrial machine is operated based on this command.

The speech recognition device is installed in, for example, a numerical controller for controlling the industrial machine. The speech recognition device may be installed in a server which is connected to the numerical controller via a local area network (LAN). Alternatively, the speech recognition device may be installed in a server which is connected to the numerical controller via the Internet if the security is retained. The following description provides an example of installing the speech recognition device in the numerical controller of the industrial machine.

Figure 1:
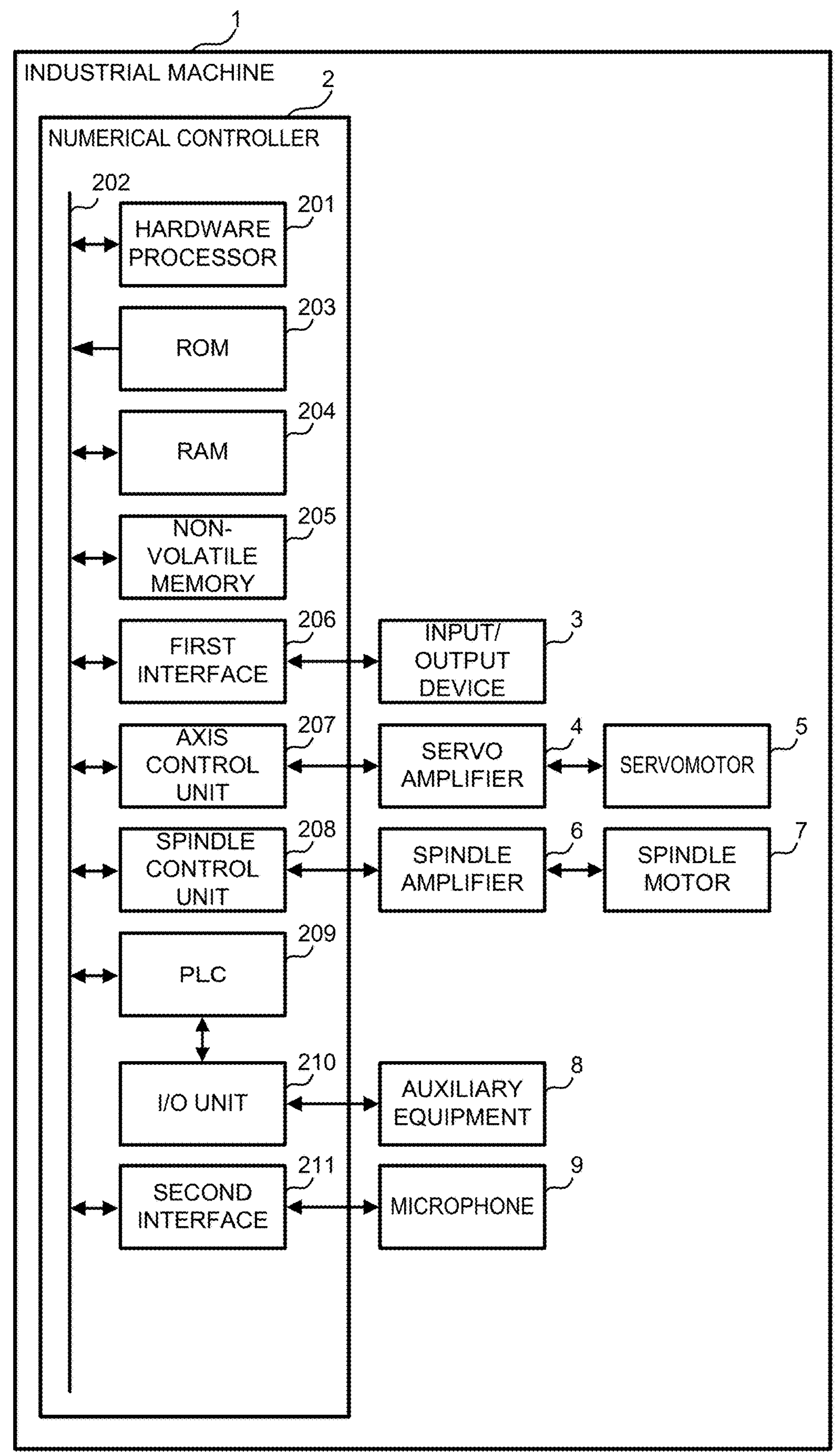
FIG. 1 is a block diagram illustrating an example of a hardware configuration of a numerical controller.

FIG. 1 is a block diagram illustrating an example of a hardware configuration of an industrial machine. An industrial machine 1 includes, for example, a machine tool, a wire electrical discharge machine, and an industrial robot. The machine tool includes a lathe, machining center, and a multitasking machine. The industrial robot includes a manipulator.

The industrial machine 1 includes a numerical controller 2, an input/output device 3, a servo amplifier 4 and a servomotor 5, a spindle amplifier 6 and a spindle motor 7, auxiliary equipment 8, and a microphone 9.

The numerical controller 2 is a device for controlling the entire industrial machine 1. The numerical controller 2 includes a hardware processor 201, a bus 202, a read only memory (ROM) 203, a random access memory (RAM) 204, and a non-volatile memory 205.

The hardware processor 201 is a processor for controlling the entire numerical controller 2 according to a system program. The hardware processor 201 is configured to read the system program and others stored in the ROM 203 via the bus 202 to thereby execute various processes based on the system program. In addition to that, the hardware processor 201 controls the servomotor 5 and the spindle motor 7 based on a machining program. The hardware processor 201 is a central processing unit (CPU) or an electronic circuit, by way of example.

The hardware processor 201 executes, for instance, analysis of the machining program as well as outputting control commands to the servomotor 5 and the spindle motor 7 for each control cycle.

The bus 202 is a communication path for interconnecting pieces of hardware in the numerical controller 2. The pieces of hardware in the numerical controller 2 exchange pieces of data via the bus 202.

The ROM 203 stores the system program and others for controlling the entire numerical controller 2. The ROM 203 is a computer-readable storage medium.

The RAM 204 temporarily stores various pieces of data. The RAM 204 serves as a work area where the hardware processor 201 processes the various pieces of data.

The non-volatile memory 205 is a storage device that retains the data even when a power source of the industrial machine 1 is turned off and thus the power is not supplied to the numerical controller 2. The non-volatile memory 205 stores, for example, the machining program and various parameters. The non-volatile memory 205 is a computer-readable storage medium. The non-volatile memory 205 consists of a solid state drive (SSD), by way of example.

The numerical controller 2 further includes a first interface 206, an axis control circuit 207, a spindle control circuit 208, a programmable logic controller (PLC) 209, an input/output (I/O) unit 210, and a second interface 211.

The first interface 206 connects the bus 202 to the input/output device 3. The first interface 206 transmits, for instance, the various pieces of data processed by the hardware processor 201 to the input/output device 3.

The input/output device 3 is configured to receive the various pieces of data through the first interface 206 to display the data. In addition to that, the input/output device 3 accepts input of the various pieces of data, and transmits the data to the hardware processor 201 via the first interface 206. The input/output device 3 is, for example, a touch panel. In the case where the input/output device 3 is the touch panel, the touch panel is a capacitive type touch panel, by way of example. For example, the input/output device 3 is attached to a control panel, not shown, in which the numerical controller 2 is contained.

The axis control circuit 207 is configured to control the servomotor 5. The axis control circuit 207 receives the control command from the hardware processor 201, so as to output a command for driving the servomotor 5 to the servo amplifier 4. The axis control circuit 207 transmits, for instance, a torque command for controlling torque of the servomotor 5 to the servo amplifier 4.

The servo amplifier 4 supply a current to the servomotor 5 in response to the command from the axis control circuit 207.

The servomotor 5 is driven upon the receipt of the current supplied by the servo amplifier 4. The servomotor 5 is coupled to, for instance, a ball screw that drives a tool post. The servomotor 5 is driven so that a structure of the industrial machine 1, such as the tool post, is moved in an X-axis direction, Y-axis direction or Z-axis direction. The servomotor 5 may incorporate a speed detector, not shown, which detects a feed rate of each feed axis.

The spindle control circuit 208 is configured to control the spindle motor 7. The spindle control circuit 208 receives the control command from the hardware processor 201 to thereby output a command for driving the spindle motor 7 to the spindle amplifier 6. For example, the spindle control circuit 208 transmits a torque command for controlling torque of the spindle motor 7 to the spindle amplifier 6.

The spindle amplifier 6 supplies the current to the spindle motor 7 in response to the command from the spindle control circuit 208.

The spindle motor 7 is driven upon the receipt of the current supplied by the spindle amplifier 6. The spindle motor 7 is coupled to a spindle to rotate the spindle.

The PLC 209 is configured to execute a ladder program to control the auxiliary equipment 8. The PLC 209 transmits a command to the auxiliary equipment 8 through the I/O unit.

The I/O unit 210 is an interface that connects the PLC 209 to the auxiliary equipment 8. The I/O unit 210 transmits the command received from the PLC 209 to the auxiliary equipment 8.

The auxiliary equipment installed to the industrial machine 1 to perform an auxiliary operation on the industrial machine 1. The auxiliary equipment 8 operates based on the command received from the I/O unit 210. The auxiliary equipment 8 may be installed on the periphery of the industrial machine 1. For example, the auxiliary equipment 8 is a tool exchanger, a cutting fluid injection device or an opening/closing door drive device.

The second interface 211 connects the bus 202 to the microphone 9. The second interface 211 transmits speech information output from the microphone 9 to the hardware processor 201.

The microphone 9 is audio equipment for acquiring speech sounds, and converting the speech sounds into speech information. The speech information means an electric signal. The microphone 9 transmits the speech information through the second interface 211 to the hardware processor 201.

Next, the speech recognition device 20 will be summarized.

Figure 2:
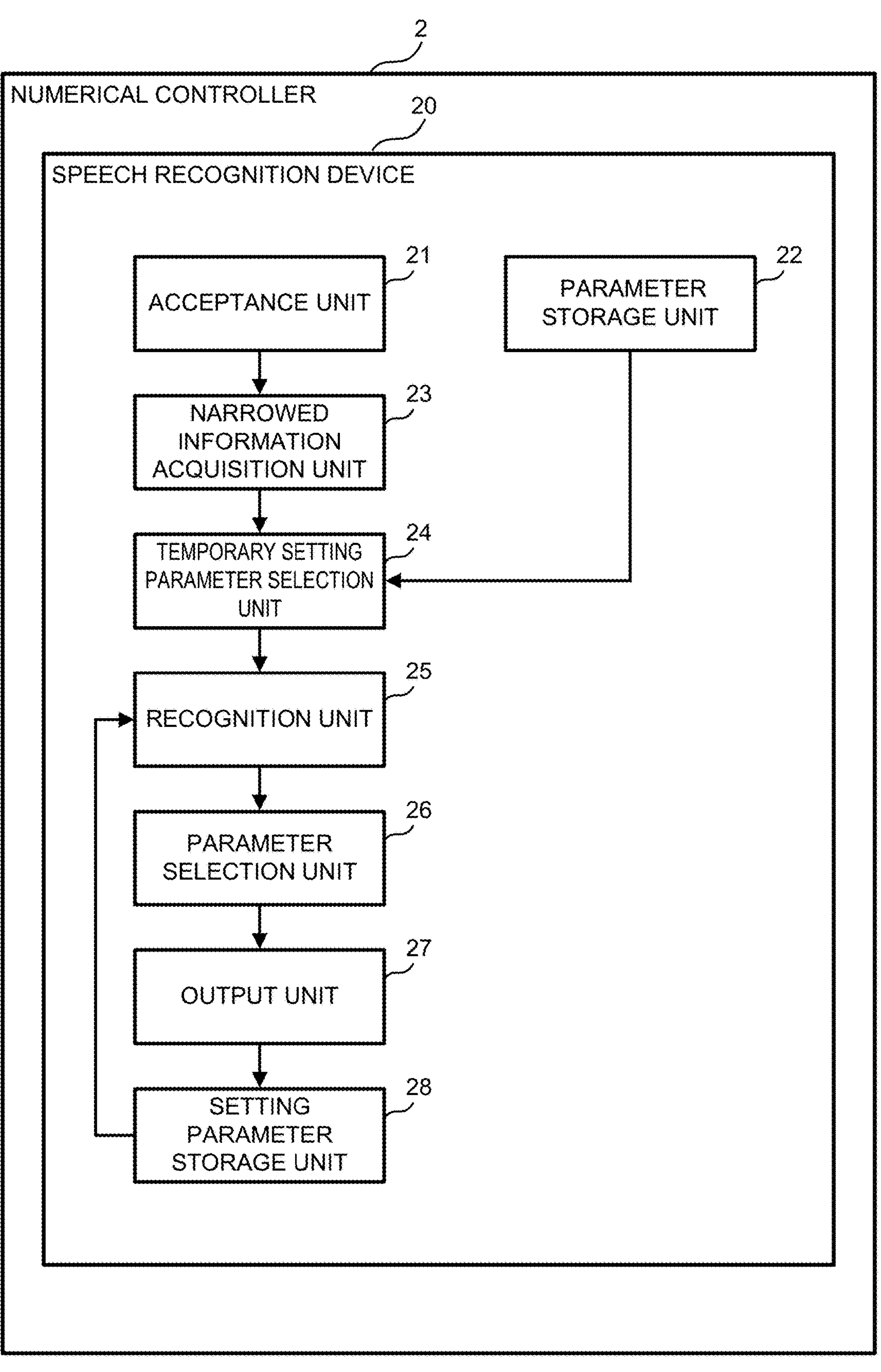
FIG. 2 is a block diagram illustrating an example of functions of a speech recognition device.

FIG. 2 is a block diagram illustrating an example of a function of the speech recognition device 20 installed in the numerical controller 2.

The speech recognition device 20 includes an acceptance unit 21, a parameter storage unit 22, a narrowed information acquisition unit 23, a temporary setting parameter selection unit 24, a recognition unit 25, a parameter selection unit 26, an output unit 27, and a setting parameter storage unit 28.

The acceptance unit 21, the narrowed information acquisition unit 23, the temporary setting parameter selection unit 24, the recognition unit 25, the parameter selection unit 26 and the output unit 27 are implemented by the hardware processor 201 executing arithmetic processing using the system program stored in the ROM 203 and the various pieces of data stored in the non-volatile memory 205, by way of example.

The parameter storage unit 22 and the setting parameter storage unit 28 are implemented, for example, by storing pieces of data and the various parameters input from the input/output device 3 in the RAM 204 or the non-volatile memory 205.

The speech recognition device 20 selects an appropriate speech recognition model from a plurality of speech recognition models stored in advance to conduct speech recognition. In order to allow the speech recognition device 20 to select the speech recognition model, parameter selection is performed. The parameter selection is performed for setting the appropriate speech recognition model to the speech recognition device 20, and thus the appropriate speech recognition model is used, so as to enable the speech recognition device 20 to recognize the speech information with high accuracy.

In order to set the appropriate speech recognition model, the temporary setting parameter selection unit 24 firstly selects a parameter to be temporarily set from the parameters stored in the parameter storage unit 22. In this regard, the temporary setting parameter selection unit 24 selects the parameter to be temporarily set from narrowed parameters based on a narrowing condition.

The recognition unit 25 recognizes the speech information by utilizing a speech recognition model stored in association with the parameter selected by the temporary setting parameter selection unit 24. For example, the recognition unit 25 utilizes the plurality of speech recognition models to perform the recognition on the speech information, thereby deriving a result of speech information recognition for each speech recognition model. The setting parameter storage unit 28 stores a temporary setting parameter that leads to, for instance, the most reliable recognition result among a plurality of recognition results.

In this way, the temporary setting parameter leading to the most reliable recognition result is set as a parameter to be used for the subsequent speech recognition process, thereby increasing the accuracy in the speech recognition. Now, each component of the speech recognition device 20 will be described in detail.

The acceptance unit 21 is configured to accept input of the speech information transmitted from the microphone 9. The speech information is, for example, an analog signal indicating speech sounds produced by a speaker. The speech information may be a digital signal obtained by converting the analog signal indicating the speech sounds. The speech sounds produced by the speaker is acquired by, for instance, the microphone 9 installed in the industrial machine 1 or the microphone 9 placed in a predetermined location in a factory.

The parameter storage unit 22 stores the plurality of parameters for setting the speech recognition model. The speech recognition model is, for example, an acoustic model and a grammar model. That is to say, the parameter storage unit 22 stores a plurality of acoustic setting parameters for setting the acoustic model and a plurality of grammar setting parameters for setting a grammar model. The speech recognition models, such as the acoustic model and the grammar model, will be described later in detail.

The acoustic setting parameter includes, for example, a Japanese-language setting parameter, an English-language setting parameter, a Chinese-language setting parameter and a German-language setting parameter. The grammar setting parameter includes, for example, a network setting parameter, a tool setting parameter, a power setting parameter for general users and a power setting parameter for administrators.

The narrowed information acquisition unit 23 acquires narrowed information for narrowing down the plurality of parameters stored in the parameter storage unit 22.

For example, the narrowed information includes speaker information for identifying a speaker who produces speech sounds. The speaker information includes, for instance, language information that indicates the language produced by the speaker, and duty information that indicates the duty assigned to the speaker.

The language information indicates at least one of, for instance, Japanese, English, Chinese and German. The duty information indicates at least one of, for instance, network setting, machining, power setting for general users and power setting for administrators.

When the acceptance unit 21 accepts speech information, the narrowed information acquisition unit 23 first performs analysis on the speech information, so as to identify a speaker, by way of example. The narrowed information acquisition unit 23 then acquires language information and duty information stored in association with the identified speaker. For example, the narrowed information acquisition unit 23 compares preregistered narrowed reference information with the speech information accepted by the acceptance unit 21 to thereby identify the speaker. The narrowed reference information is, for instance, speech information indicating speech sounds produced by the speaker.

The narrowed information may include time information for determining an acceptance time of accepting the speech information by the acceptance unit 21. The narrowed information may include location information for determining a location of the microphone 9 that acquires the speech sounds.

The temporary setting parameter selection unit 24 selects temporary setting parameter to be temporarily set from the plurality of parameters based on the narrowed information. That is to say, the temporary setting parameter selection unit 24 narrows down the parameter to be temporarily set based on the narrowed information.

The temporary setting parameter selection unit 24 may select one of the plurality of parameters as a temporary setting parameter. The temporary setting parameter selection unit 24 may select a set of parameters, which includes multiple parameters, from the plurality of parameters. The temporary setting parameter selection unit 24 may select multiple sets of parameters.

For example, when the narrowed information acquisition unit 23 acquires language information indicating Japanese and duty information indicating network setting as speaker information, the temporary setting parameter selection unit 24 selects a Japanese setting parameter and a network setting parameter as parameters to be temporarily set.

On the other hand, when the narrowed information acquisition unit 23 acquires only the language information indicating Japanese as the speaker information, the temporary setting parameter selection unit 24 selects the Japanese-language setting parameter as a parameter to be temporarily set. In this case, the temporary setting parameter selection unit 24 may select, for example, two sets of parameters as the temporary setting parameters, i.e., a set of the Japanese-language setting parameter and the network setting parameter and a set of the Japanese-language setting parameter and a tool setting parameter.

The recognition unit 25 recognizes the speech information based on the temporary setting parameters selected by the temporary setting parameter selection unit 24. More specifically, the recognition unit 25 recognizes the speech information by utilizing a speech recognition model stored in association with the temporary setting parameter. In a case where the temporary setting parameter selection unit 24 selects multiple sets of the temporary setting parameters, the speech information is recognized by using each set of the temporary setting parameters.

Figure 3:
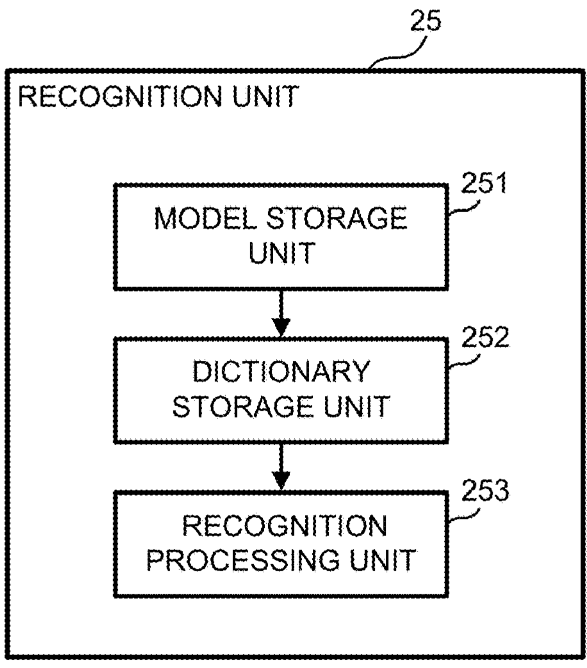
FIG. 3 is a block diagram illustrating an example of functions of a recognition unit.

FIG. 3 is a block diagram illustrating an example of functions of the recognition unit 25. The recognition unit 25 includes a model storage unit 251, a dictionary storage unit 252 and a recognition processing unit 253.

The model storage unit 251 is configured to store a plurality of speech recognition models corresponding to the plurality of parameters stored in the parameter storage unit 22. As described above, the speech recognition model includes, for example, the acoustic model and the grammar model.

The acoustic model is utilized for determining phonemes contained in the speech information. For example, the acoustic model includes a Japanese-language model, an English-language model, a Chinese-language model and a German-language model. The Japanese-language model, the English-language model, the Chinese-language model and the German-language model are utilized by the recognition unit 25 when the Japanese-language setting parameter, the English-language setting parameter, the Chinese-language setting parameter and the German-language setting parameter are respectively set. The acoustic model is generated, for example, when machine learning is performed using speech information on speech sounds produced by a speaker of each language as training data.

The grammar model is utilized to determine a sequence of the phonemes, namely a string of letters that matches a phoneme pattern, and a sequence of words, as well as deriving a string of letters and a sequence of words appropriate for language. The grammar model includes a network setting model, a tool setting model, a power setting model for general users and a power setting model for administrators, by way of example.

The network setting model is a grammar model for making highly accurate determination on words, a string of letters, commands and others used for the network setting. The tool setting model is a grammar model for making highly accurate determination on words, a string of letters, commands and others used for the tool setting. The power setting model for general users is a grammar model for making highly accurate determination on words, a string of letters, commands and others used for the power setting for general users. The power setting model for administrators is a grammar model for making highly accurate determination on words, a string of letters, commands and others used for the power setting for administrators.

The network setting model, the tool setting model, the power setting model for general users and the power setting model for administrators each include Japanese-based models, English-based models, Chinese-based models and German-based models.

Each grammar model is created by performing the machine learning using text information on the language produced by the speaker of each language as training data. For example, for the network setting model, the training data is text information indicating a string of letters and a sequence of words used by a worker who conducts the network setting. The grammar model is a formulated sentence structure, such as a sequence of parts of speech, formulated relevance of each word or the like.

The network setting model, the tool setting model, the power setting model for general users and the power setting model for administrators are utilized by the recognition unit 25 when the network setting parameter, the tool setting parameter, the power setting parameter for general users and the power setting parameter for administrators are set.

The dictionary storage unit 252 is configured to store dictionaries. The dictionary includes, for instance, a Japanese-language dictionary, an English-language dictionary, a Chinese-language dictionary and a German-language dictionary.

The recognition processing unit 253 is configured to execute speech recognition processing by using a speech recognition model. The recognition processing unit 253 first extracts feature quantities from the speech information. The recognition processing unit 253 extracts, for example, speech intensity and frequency characteristic as feature quantities from the speech information, which is an analog signal.

The recognition processing unit 253 determines phonemes contained in the speech information according to the extracted feature quantities by using the acoustic model. For example, in a case where the Japanese-language model is selected by the temporary setting parameter selection unit 24, the recognition processing unit 253 uses the Japanese-language model to determine Japanese phonemes contained in the speech information and a sequence of the phonemes according to the feature quantities.

The recognition processing unit 253 uses the grammar model to determine a string of letters that matches a phoneme pattern and a sequence of words as well as deriving a string of letters and a sequence of words appropriate for language. In other words, the recognition processing unit 253 uses the grammar model to make the speech information into text for facilitating the understanding of the meaning of the language indicated by the speech information. The recognition processing unit 253 uses the dictionaries stored in the dictionary storage unit 252 to determine the string of letters and the sequence of words that matches the phoneme pattern.

For example, when the temporary setting parameter selection unit 24 selects the Japanese-language setting parameter and the network setting parameter, the recognition processing unit 253 uses the Japanese-based network setting model to make the speech information into text.

For making the speech information into text, the recognition processing unit 253 keeps a plurality of candidates for the string of letters and the sequence of words matching the phoneme pattern to make a search for optimal string of letters and sequence of words. The maximum number of the plurality of candidates is called as a beam width, and the beam width is set to 1, 3 or 5, by way of example.

The recognition processing unit 253 determines information that indicates a result of the speech recognition. The information indicating the recognition result includes reliability showing the accuracy of the speech information recognition. In a case where the number of candidates for the string of letters and the sequence of words in the form of text is large, the recognition processing unit 253 concludes that the reliability of each recognition result is low. On the other hand, in a case where the number of candidates for the string of letters and the sequence of words in the form of text is small, the recognition processing unit 253 concludes that the reliability of each recognition result is high. The recognition processing unit 253 determines the reliability with a value of 0 or more and 1 or less. The determination about the reliability is not limited to the above-described method, and a different method can be employed.

For example, in a case where the recognition unit 25 recognizes speech information on speech "I want to check an IP address" produced by a predetermined language, such as Japanese, English, Chinese and Germany, information indicating a recognition result is derived as "I want to check an IP address (Reliability 0.8)" and "Power Off (Reliability 0.1)".

The parameter selection unit 26 is configured to select any of the temporary setting parameters based on the information indicating the recognition result of the recognized speech information. For example, the parameter selection unit 26 selects any of the temporary setting parameters based on the reliability. A temporary setting parameter selected by the parameter selection unit 26 will be hereinafter referred to as a setting parameter.

For example, the parameter selection unit 26 selects a setting parameter having the highest reliability. That is to say, the parameter selection unit 26 selects a set of setting parameters having the highest reliability from among plural sets of the parameters selected by the temporary setting parameter selection unit 24. Alternatively, the parameter selection unit 26 may select a setting parameter whose reliability is equal to or higher than a predetermined threshold value.

The output unit 27 is configured to output the setting parameter selected by the parameter selection unit 26. In other words, when the setting parameter storage unit 28 stores the setting parameter, the output unit 27 outputs information indicating that the setting parameter storage unit 28 stores the setting parameter.

For example, the output unit 27 outputs the information indicating that the setting parameter storage unit 28 stores a temporary setting parameter to an indicator, the input/output device 3 or a speaker installed on the industrial machine 1. The output unit 27 may output information indicating that the setting parameter storage unit 28 has stored the setting parameter, when the setting parameter storage unit 28 has stored the setting parameter.

The output unit 27 also outputs a result of speech recognition derived by the setting parameter selected by the parameter selection unit 26.

Figure 4:
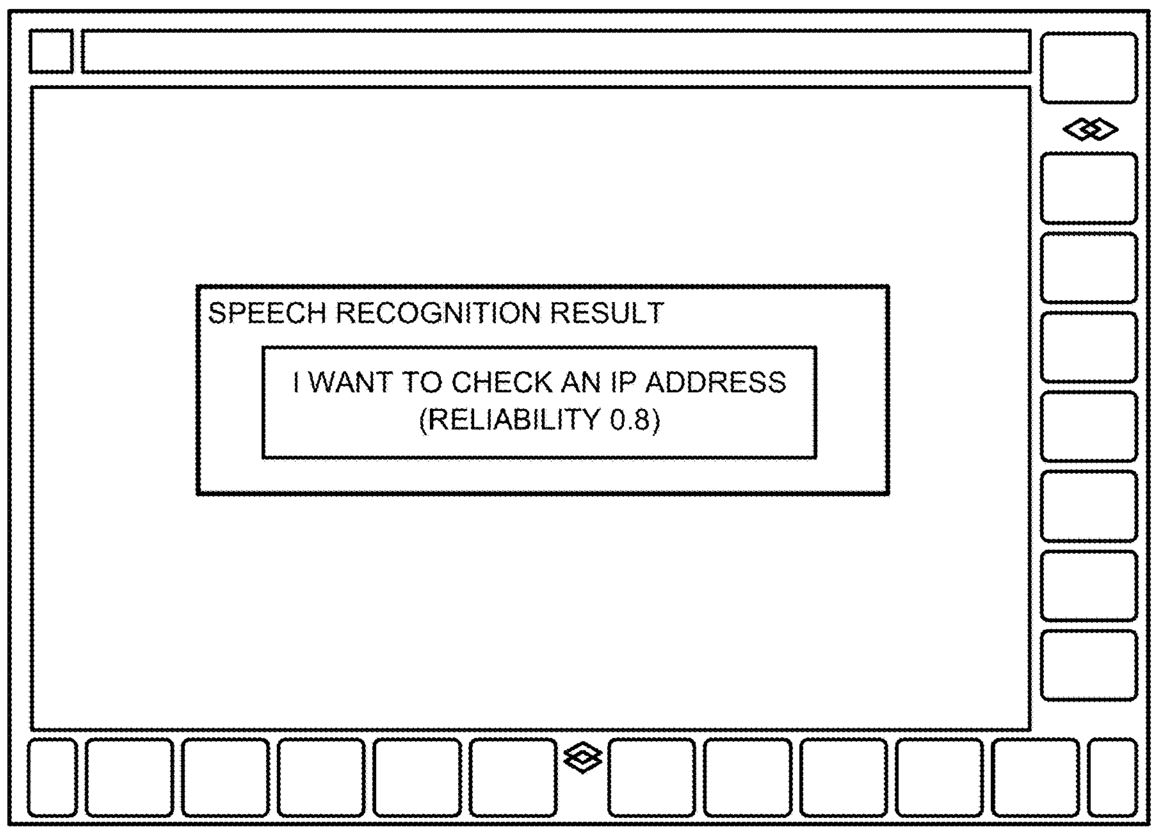
FIG. 4 is a diagram illustrating an example of an image displayed on a display screen of an input/output device.

FIG. 4 is a diagram illustrating an example of an image displayed on a display screen of the input/output device 3. When the parameter selection unit 26 selects the setting parameter, a pop-up window presenting a recognition result is displayed on the display screen, for instance.

The setting parameter storage unit 28 is configured to store the setting parameter selected by the parameter selection unit 26. That is to say, the setting parameter selected by the parameter selection unit 26 is stored in the setting parameter storage unit 28, so that the parameter setting is performed.

When the setting parameter is stored in the setting parameter storage unit 28, i.e. the parameter setting is performed, the recognition unit 25 recognizes the speech information based on the setting parameter.

An example of a processing flow executed in the speech recognition device 20 will now be described. The processing conducted in the speech recognition device 20 includes a process to be conducted in a preparation stage, a process to be conducted in a parameter setting stage, and a process to be conducted after the parameter setting.

Figure 5:
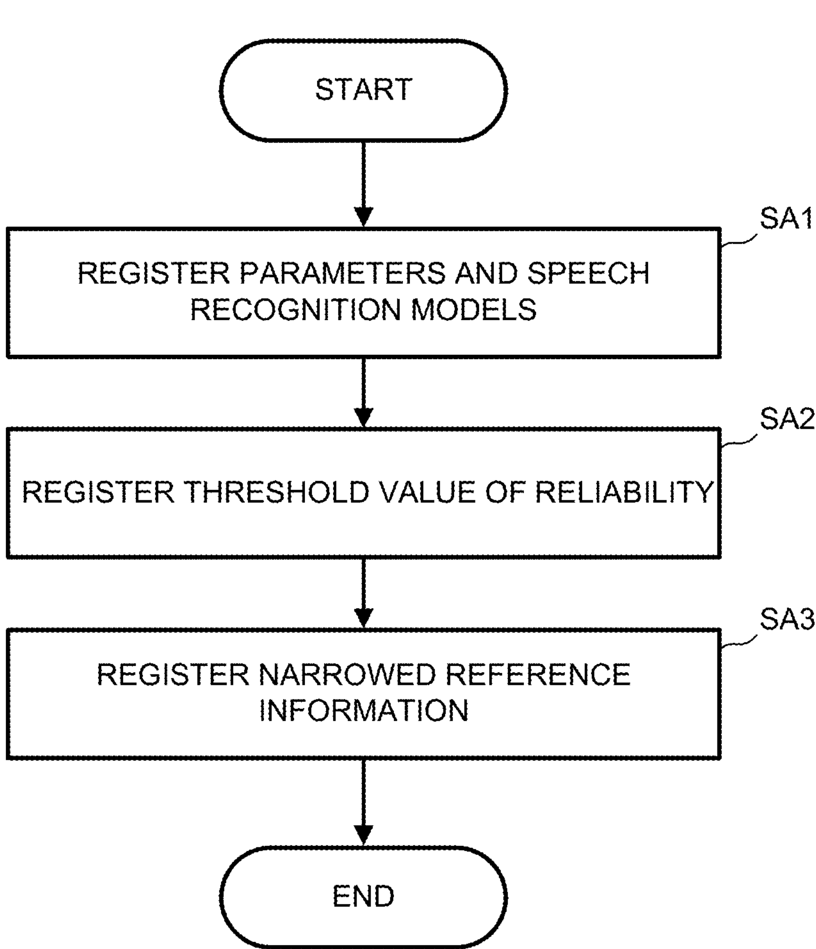
FIG. 5 is a flowchart illustrating an example of processing executed in a preparation stage.

FIG. 5 is a flowchart illustrating an example of the process to be conducted in the preparation step. In the speech recognition device 20, parameters and speech recognition models are registered (Step SA1). That is to say, the parameter storage unit 22 and the model storage unit 251 store a plurality of parameters and a plurality of speech recognition models corresponding to the plurality of parameters, respectively. In this step, another process, such as the registration of dictionaries, may be executed.

Then, a threshold value for the reliability is registered (Step SA2). More specifically, a threshold value for the reliability is stored in a predefined storage unit, not shown, the threshold value being a criterion for the parameter selection unit 26 to select a temporary setting parameter. This process is not executed in a case where the registration of the threshold is not required due to a situation where the parameter selection unit 26 selects a temporary setting parameter that leads to the highest reliability, by way of example.

Then, narrowed reference information is registered (Step SA3), and the processing is completed.

The process to be conducted in the parameter setting stage will now be described.

Figure 6:
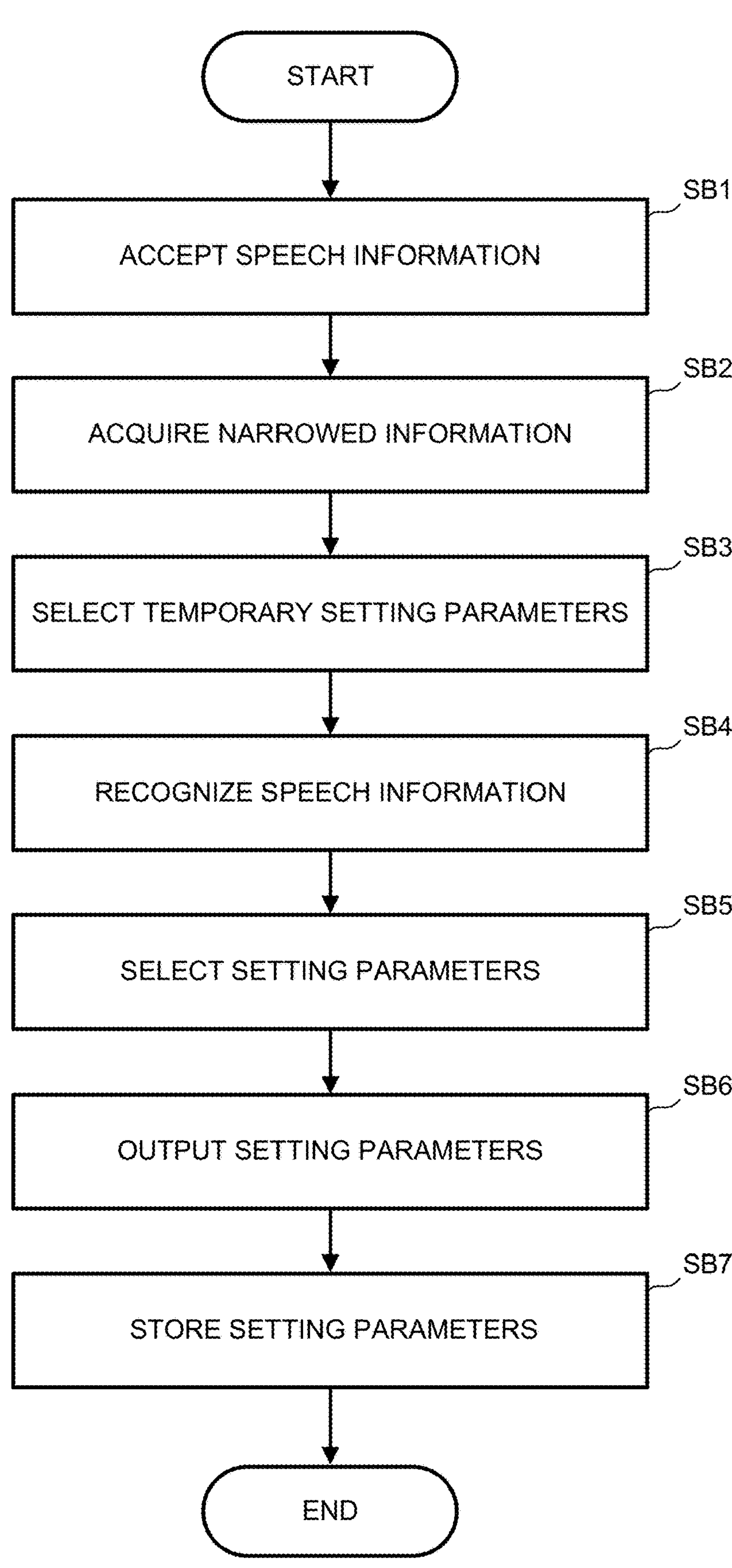
FIG. 6 is a flowchart illustrating an example of processing executed in a parameter setting stage.

FIG. 6 is a flowchart illustrating an example of the process conducted in the parameter setting stage. Firstly, the acceptance unit 21 accepts speech information in the parameter setting stage (Step SB1).

Secondly, the narrowed information acquisition unit 23 acquires narrowed information (Step SB2).

The temporary setting parameter selection unit 24 in turn selects temporary setting parameters (Step SB3).

Subsequently, the recognition unit 25 recognizes the speech information (Step SB4). For example, the recognition unit 25 recognizes the speech information based on plural sets of the temporary setting parameters selected by the temporary setting parameter selection unit 24.

Then, the parameter selection unit 26 selects any of the temporary setting parameters as setting parameters based on the result of the recognition made by the recognition unit 25 (Step SB5).

The output unit 27 in turn outputs the setting parameters selected by the parameter selection unit 26 (Step SB6).

After that, the setting parameter storage unit 28 stores the setting parameters (Step SB7), and the processing is completed.

Next, a description will be made about the processing to be executed after setting the parameters.

Figures 7, 8:
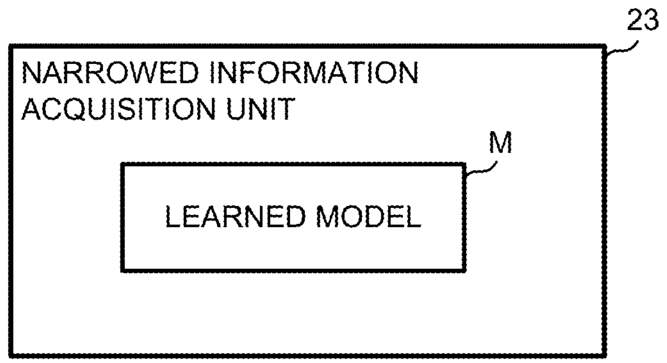
FIG. 7 is a flowchart illustrating an example of processing executed after parameter setting.
FIG. 8 is a block diagram illustrating an example of functions of a narrowed information acquisition unit.

FIG. 7 is a flowchart illustrating an example of the processing to be carried out after setting the parameters. After setting the parameter, the acceptance unit 21 accepts the speech information (Step SC1).

Then, the recognition unit 25 recognizes the speech information (Step SC2). At this time, the recognition unit 25 recognizes the speech information by using a speech recognition model associated with the setting parameter. Consequently, for instance, a command is produced for the numerical controller 2, so that the numerical controller 2 is controlled or various settings are made based on the produced command. After the processing, such as network setting, by means of the speech recognition device 20 is finished, the speech recognition device 20 terminates this processing.

In the parameter setting stage shown in FIG. 6, the speech information accepted by the acceptance unit 21 is used only for the parameter setting. However, when the speech information accepted by the acceptance unit 21 is recognized as a command to be executed by the numerical controller 2, for example, the control unit of the numerical controller 2, not shown, may execute this command.

As described above, the speech recognition device 20 includes the acceptance unit 21 for accepting the input of the speech information, the parameter storage unit 22 for storing the plurality of parameters for setting the speech recognition model, the temporary setting parameter selection unit 24 for selecting the temporary setting parameters to be temporarily set from the plurality of parameters based on the narrowed information, the recognition unit 25 for recognizing the speech information based on the selected temporary setting parameters, and the parameter selection unit 26 for selecting any of the temporary setting parameters as a setting parameter based on the information indicating the recognition result of the recognized speech information.

Thus, an appropriate parameter is automatically selected in the speech recognition device 20. More specifically, an optimal speech recognition model for the speech recognition is automatically selected in the speech recognition device

20. Consequently, the workload of selecting the speech recognition model can be reduced.

In addition, the parameters to be temporarily set are narrowed based on the narrowed information in the speech recognition device 20. This can reduce the number of parameters or the number of sets of parameters to be temporarily set. Consequently, the workload of the speech recognition can be reduced in the speech recognition device 20.

The plurality of parameters includes at least either of the plurality of acoustic setting parameters for setting the acoustic model and the plurality of grammar setting parameters for setting the grammar model. In addition to that, the information indicating the recognition result includes the information indicating the reliability of the recognition result. The parameter selection unit 26 selects a setting parameter having the highest reliability. Alternatively, the parameter selection unit 26 selects a setting parameter having the reliability equal to or more than a predefined threshold value. Thus, the speech recognition device 20 can increase the accuracy of the speech recognition.

The narrowed information includes speaker information for identifying a speaker who produces speech sounds. In this case, the temporary setting parameter selection unit 24 selects a temporary setting parameter based on the speaker information. It enables optimal parameter setting for the speaker. That is to say, an optimal model is selected from multiple speech recognition models.

For example, in the field of industrial machinery for, such as, a factory, the scope of the duty of each worker is limited. Thus, even if various grammar models corresponding to each duty are registered in advance, the optimal grammar model is selected. In this case, each grammar model is for recognizing speech information specific to each duty. Thus, the speech recognition device 20 can increase the accuracy of the speech recognition.

The narrowed information also includes time information for determining an acceptance time of accepting the speech information by the acceptance unit 21. For example, at nighttime, there is a low probability of tool setting in the numerical controller 2 because the industrial machine 1 performs continuous machining. Thus, even if the speech recognition device 20 accepts speech information during nighttime, the temporary setting parameter selection unit 24 can keep from selecting a tool setting parameter as a temporary setting parameter. That is to say, the speech recognition device 20 can narrow the temporary setting parameter efficiently.

Furthermore, the narrowed information includes location information for specifying the location where the microphone 9 for acquiring speech sounds is installed. For example, workers are preassigned to the industrial machine 1 in the factory. Thus, in a case where the microphone 9 is installed to the industrial machine 1, a speaker can be identified in the most cases when the location information is identified. Consequently, the speech recognition device 20 can efficiently narrow the temporary setting parameters based on the location information.

The speech recognition device 20 further includes the setting parameter storage unit 28 that stores setting parameters selected by the parameter selection unit 26, and the recognition unit 25 recognizes speech information based on the setting parameters stored in the setting parameter storage unit 28. In this way, the speech recognition device 20 can recognize the speech information based on the automatically-set parameters.

In addition to that, the speech recognition device 20 further includes the output unit 27 that outputs information indicating that the setting parameter storage unit 28 stores the setting parameters when the setting parameter storage unit 28 stores the setting parameters.

The above-described embodiment presents one example in which the preregistered speech information on the speaker is compared with the speech information accepted by the acceptance unit 21 so that the narrowed information acquisition unit 23 can acquire the speaker information. Alternatively, the speaker information may be acquired in a different way. For example, the narrowed information acquisition unit 23 may have a learned model for inferring the speaker information.

FIG. 8 is a block diagram illustrating an example of the functions of the narrowed information acquisition unit 23. The narrowed information acquisition unit 23 has a learned model M for identifying the speaker. The narrowed information acquisition unit 23 inputs the speech information accepted by the acceptance unit 21 to the learned model M so as to acquire an output indicating an inferred result of the speaker information from the learned model M.

The learned model M is produced by, for instance, causing a machine learning device to learn speech information of various speech sounds produced by a plurality of speakers who use the speech recognition device 20. The machine learning device generates the learned model M by deep learning, for example. The machine learning device may be installed in the speech recognition device 20, or may be installed in a device other than the speech recognition device 20.

The speech recognition device 20 may further include a history information storage unit for storing history information on a setting parameter selected by the parameter selection unit 26.

Figure 9:
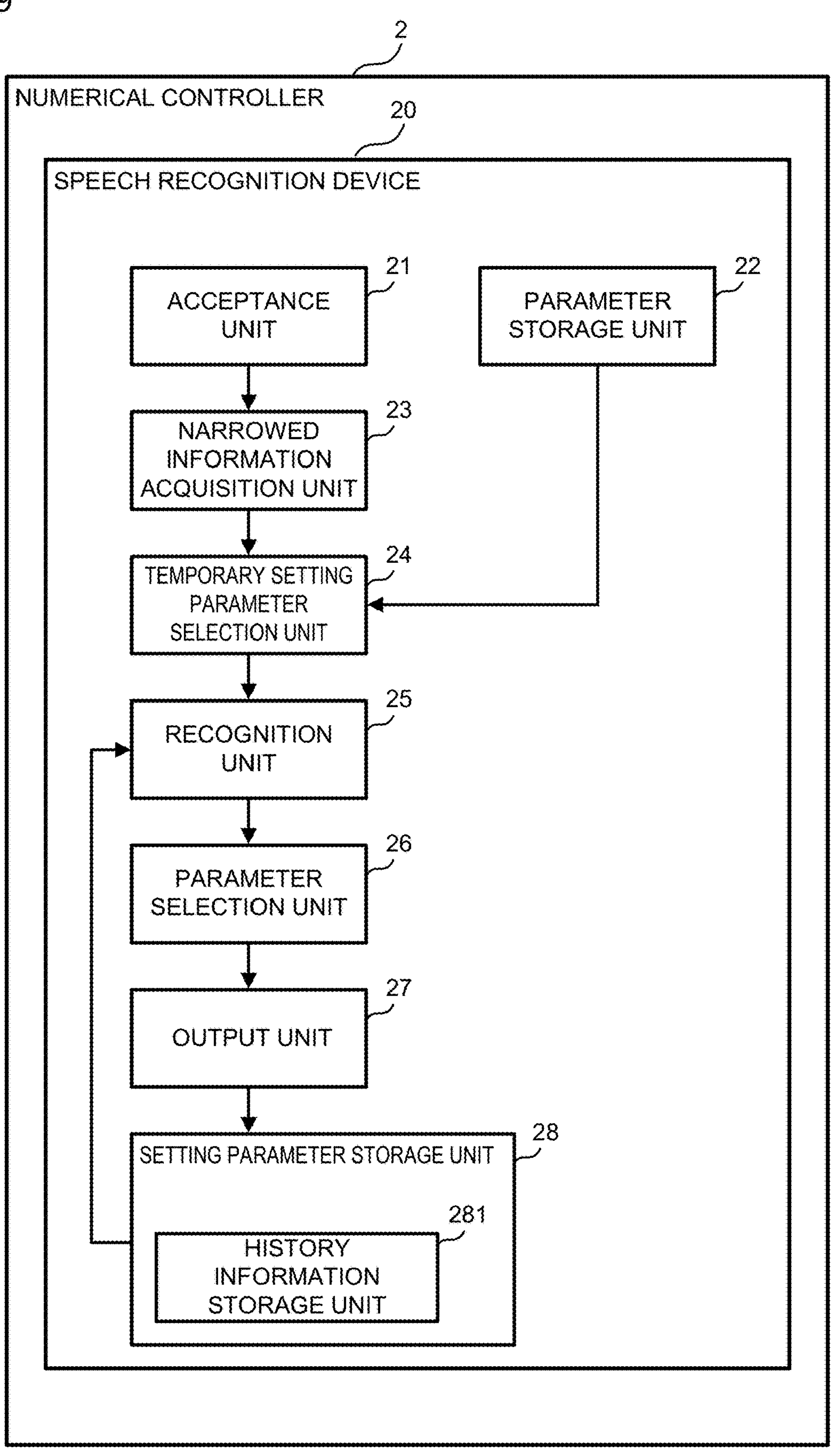
FIG. 9 is a block diagram illustrating an example of the functions of the speech recognition device.

FIG. 9 is a block diagram illustrating an example of the functions of the speech recognition device 20. The speech recognition device 20 shown in FIG. 9 is different from the speech recognition device 20 shown in FIG. 2 in that the setting parameter storage unit 28 includes a history information storage unit 281.

The history information storage unit 281 is configured to store the history information on the setting parameter selected by the parameter selection unit 26. Thus, the history information storage unit 281 accumulates and stores a selected setting parameter each time the parameter selection unit 26 selects a new setting parameter.

In this case, the temporary setting parameter selection unit 24 may use the history information stored in the history information storage unit 281 as narrowed information to select a temporary setting parameter to be temporarily set from the plurality of parameters. In other words, the narrowed information includes the history information stored in the history information storage unit 281.

For example, the temporary setting parameter selection unit 24 selects the temporary setting parameters from the parameters stored in the history information storage unit 281, namely selects temporary setting parameters from the parameters used for speech recognition performed by the recognition unit 25. It can reduce the processing load of selecting the temporary setting parameters and thus can increase the processing speed. That is to say, the temporary setting parameters can be narrowed efficiently.

In the above-described embodiment, the setting parameters selected by the parameter selection unit 26 are stored in the setting parameter storage unit 28. The setting parameters selected by the parameter selection unit 26 do not need to be stored in the setting parameter storage unit 28. In which case, the speech recognition device 20 further includes an instruction information acceptance unit that accepts instruction information for instructing the setting parameter storage unit 28 not to store the setting parameters, and when the instruction information acceptance unit does not accept instruction information within a predefined period for acceptance, the setting parameter storage unit 28 may be allowed to store the setting parameters selected by the parameter selection unit 26.

Figure 10:
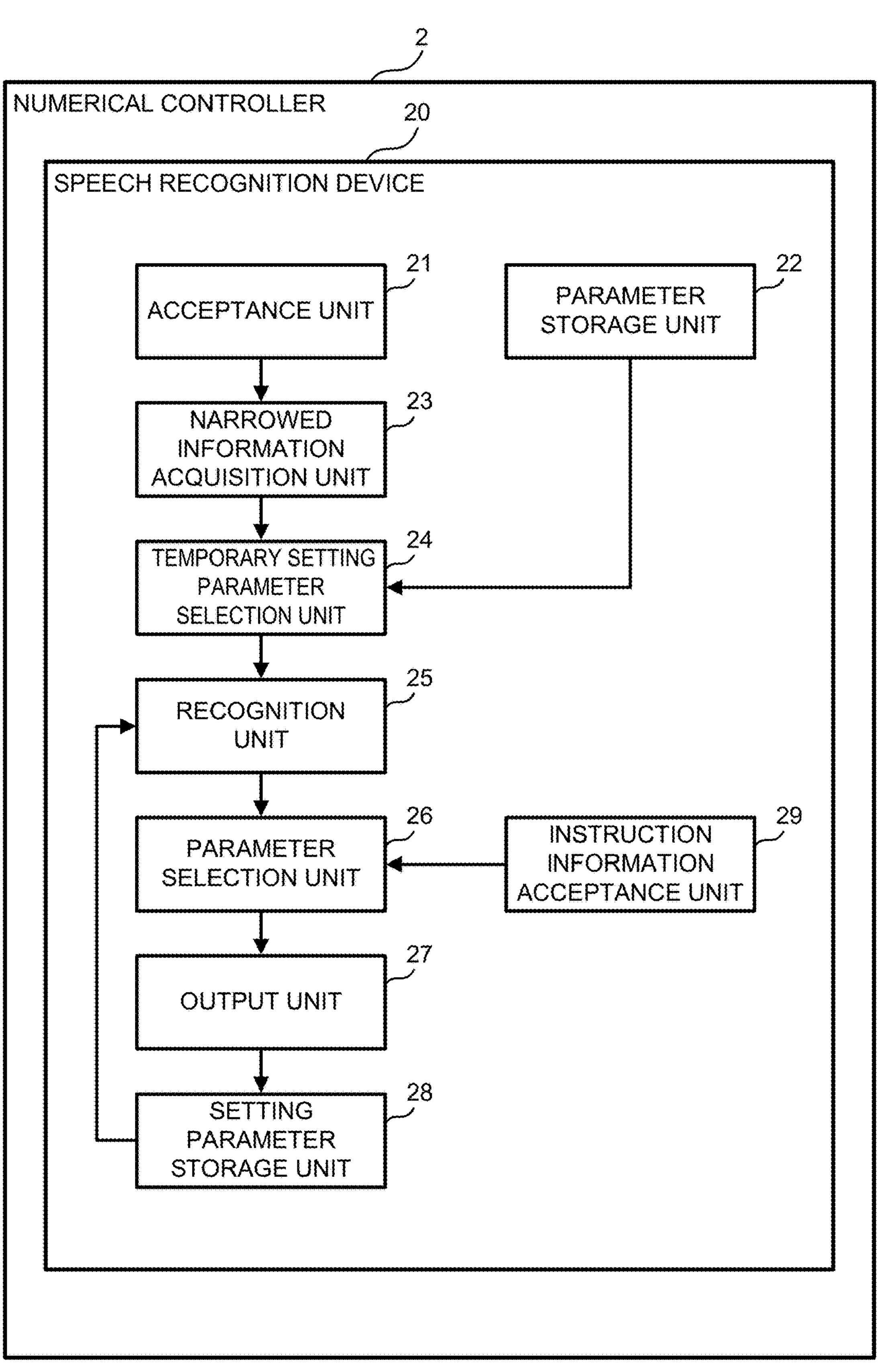
FIG. 10 is a block diagram illustrating an example of the functions of the speech recognition device.

FIG. 10 is a block diagram illustrating an example of the functions of the speech recognition device 20. The speech recognition device 20 includes an instruction information acceptance unit 29, in addition to the functions of the speech recognition device 20 shown in FIG. 2.

The instruction information acceptance unit 29 is configured to accept the instruction information for instructing the setting parameter storage unit 28 not to store the setting parameters selected by the parameter selection unit 26. For example, when the parameter selection unit 26 selects the setting parameters, the output unit 27 outputs information indicating a recognition result derived by the selected setting parameters to the input/output device 3. The input/output device 3 displays the information indicating the recognition result output from the output unit 27 on the display screen.

Figure 11:
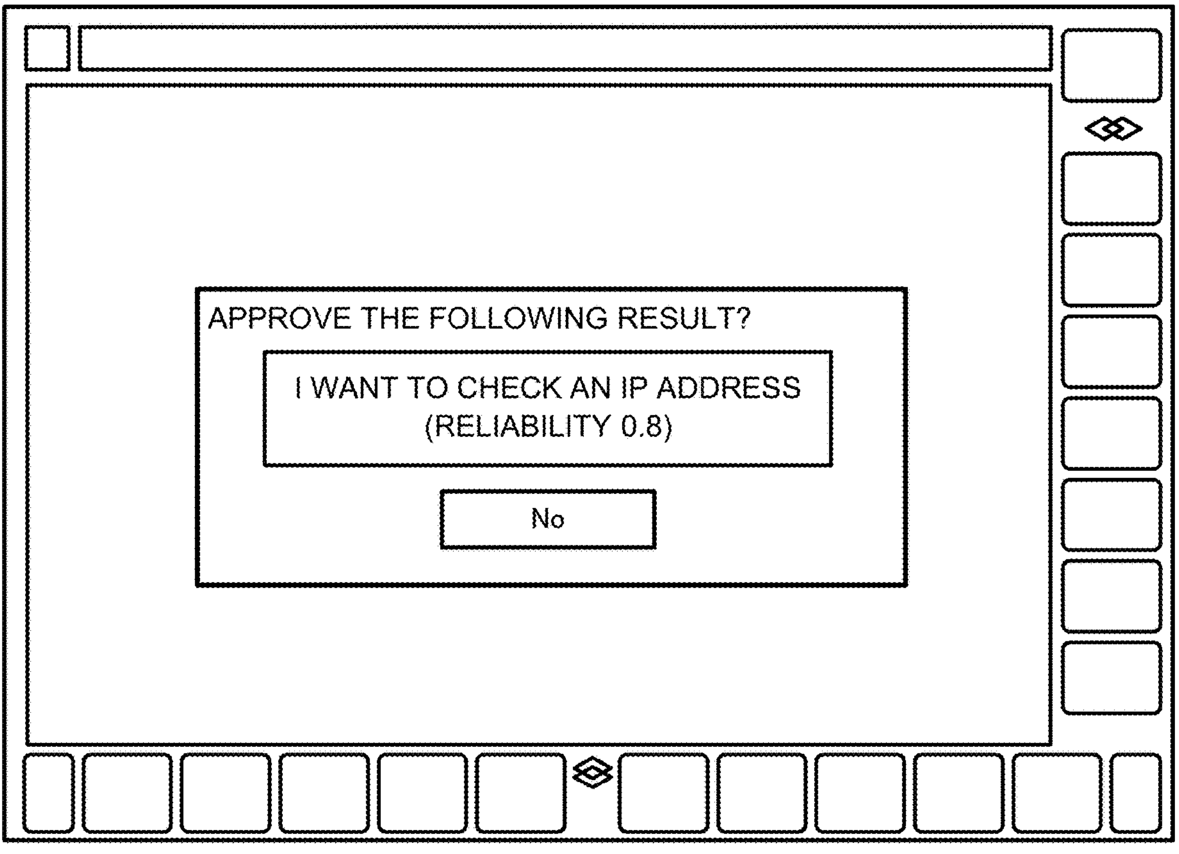
FIG. 11 is a diagram illustrating an example of an image displayed on the display screen of the input/output device.

FIG. 11 shows an example of an image displayed on the display screen of the input/output device 3. Displayed on the display screen is an image for instructing the setting parameter storage unit 28 not to store the setting parameters. More specifically, on the display screen, an image showing the recognition result of the speech information accepted by the acceptance unit 21 with a button image for instructing not to approve the recognition result is displayed. In this image, the recognition result includes a string of letters of the speech information in the text form “I want to check an IP address” and a string of letters of “Reliability 0.8” representing the accuracy of the recognition of the speech information.

For example, the input/output device 3 displays the information indicating the recognition result derived by the setting parameters selected by the parameter selection unit 26 on the display screen for three seconds. When the button image is touched within three seconds, the instruction information acceptance unit 29 accepts the instruction information for instructing the setting parameter storage unit 28 not to store the setting parameters. In this case, the setting parameter storage unit 28 does not store the setting parameters.

On the other hand, when the button image is not touched within three seconds, the instruction information acceptance unit 29 does not accept the instruction information for instructing the setting parameter storage unit 28 not to store the setting parameters. In this case, the setting parameter storage unit 28 stores the setting parameters selected by the parameter selection unit 26.

In this way, the worker can choose whether to conduct the parameter setting depending on whether an appropriate setting parameter is selected by the parameter selection unit 26.

The present disclosure is not limited to the above-described embodiments and may be modified as appropriate based on the gist of the invention. In the present disclosure, any constituent elements in the embodiments can be varied, or any constituent elements in the embodiments can be omitted.

REFERENCE SIGNS LIST

1 Industrial Machine
2 Numerical Controller
20 Speech Recognition Device
201 Hardware Processor
202 Bus
203 ROM
204 RAM
205 Non-Volatile Memory
206 First Interface
207 Axis Control Circuit
208 Spindle Control Circuit
209 PLC
210 I/O Unit
211 Second Interface
21 Acceptance Unit
22 Parameter Storage Unit
23 Narrowed Information Acquisition Unit
24 Temporary Setting Parameter Selection Unit
25 Recognition Unit
251 Model Storage Unit
252 Dictionary Storage Unit
253 Recognition Processing Unit
26 Parameter Selection Unit
27 Output Unit
28 Setting Parameter Storage Unit
281 History Information Storage Unit
29 Instruction Information Acceptance Unit
3 Input/output Device
4 Servo Amplifier
5 Servomotor
6 Spindle Amplifier
7 Spindle Motor
8 Auxiliary Equipment
9 Microphone
M Learned Model

The invention claimed is:

1. A speech recognition device, comprising:
at least one processor; and
a memory storing a program executed by the at least one processor, wherein
the memory stores a plurality of parameters for setting a speech recognition model of speech recognition models,
the at least one processor is configured to:
accept input of speech information,
acquire the plurality of parameters for setting the speech recognition model from the memory,
select, from the plurality of parameters, a plurality of temporary setting parameters to be temporarily set, based on narrowed information,
perform recognition processing on the speech information using the speech recognition models respectively corresponding to the plurality of temporary setting parameters, and obtain a plurality of recognition results,
finally determine one setting parameter from among the plurality of temporary setting parameters based on reliability of the plurality of recognition results, and
perform subsequent recognition processing based on the finally determined one setting parameter, and
the plurality of parameters includes at least either a plurality of acoustic setting parameters for setting an acoustic model, or a plurality of grammar setting parameters for setting a grammar model.

2. The speech recognition device according to claim 1, wherein the at least one processor is configured to select, as the finally determined one setting parameter, a temporary setting parameter that provides the reliability being highest.

3. The speech recognition device according to claim 1, wherein the at least one processor is configured to select, as the finally determined one setting parameter, a temporary setting parameter that provides the reliability equal to or higher than a predetermined threshold value.

4. The speech recognition device according to claim 1, wherein the narrowed information includes speaker information for identifying a speaker who produces speech.

5. The speech recognition device according to claim 4, wherein the narrowed information is obtained by a learned model for inferring the speaker information.

6. The speech recognition device according to claim 1, wherein the narrowed information includes either:

time information for specifying an acceptance time at which the speech information is accepted, or location information for specifying a location where a microphone is installed.

7. The speech recognition device according to claim 1, wherein the memory stores history information of the plurality of temporary setting parameters selected by the at least one processor, and the narrowed information includes the history information stored in the memory.

8. The speech recognition device according to claim 1, wherein the memory stores the plurality of temporary setting parameters selected by the at least one processor, and the at least one processor is configured to recognize the speech information based on the plurality of temporary setting parameters stored in the memory.

9. The speech recognition device according to claim 8, wherein the at least one processor is configured to accept instruction information instructing that the plurality of temporary setting parameters not be stored in the memory, and the memory is configured to, in response to the at least one processor not accepting the instruction information within a predetermined acceptance period, store the plurality of temporary setting parameters selected by the at least one processor.

10. The speech recognition device according to claim 8, wherein the at least one processor is configured to output further information indicating that the memory stores the plurality of temporary setting parameters in response to the memory storing the plurality of temporary setting parameters.

* * * * *